3,481,694
PROCESS FOR PRODUCING A TANTALUM OXIDE ION EXCHANGE MATERIAL
Fred Hudswell, East Hagbourne, near Didcot, and John Clifford Hildrith Waldron, Harwell, Didcot, England, assignors to United Kingdom Atomic Energy Authority, London, England
No Drawing. Filed July 14, 1966, Ser. No. 565,060
Claims priority, application Great Britain, July 19, 1965, 30,700/65
Int. Cl. C01g *35/00;* C01g *1/02*
U.S. Cl. 23—15                                         1 Claim

ABSTRACT OF THE DISCLOSURE

Hydrated tantalum oxide ion exchange material is provided by fusing tantalum oxide or tantalite with potassium hydroxide, dissolving the fused product in water, filtering to remove any undissolved solids, adjusting the concentration of $Ta_2O_5$ to be not greater than 5 g. per liter of water, and precipitating hydrated tantalum oxide therefrom with solid carbon dioxide.

---

The present invention relates primarily to ion exchange materials.

It will be well known that water cooled nuclear reactors (hereinafter called water reactors) include generally a water (or steam) circuit wherein water is forced through the nuclear core where it is heated and through a heat exchanger, turbine or other device where the useful heat is extracted. In power reactors of the pressurised water type, the water is at a temperature of about 300° C., and consequently under a very high pressure, and, since the water passes through the core of the reactor, it is essential to keep this water clean in order to avoid an undesirable build up in radioactivity. The present arrangement uses synthetic organic ion exchange resins to remove the ionic species in the water but such resins are unstable at temperatures over about 80° C. so that it is necessary to arrange the ion exchange equipment in a bypass circuit and a proportion of water is bled off, cooled, passed through the ion exchange equipment, reheated and then reintroduced into the main circuit. It is clear that this is an inefficient process and that there would be advantages in providing the ion exchange equipment in the main water flow, but to do this would require an ion exchange material capable of withstanding water at 300° C.

It is the object of the present invention to provide such an ion exchange material.

It is another object of the present invention to provide an exchange material comprising essentially hydrated tantalum oxide.

Thus it is a further object of the present invention to provide in or for a water cooled nuclear reactor an ion exchange clean-up system having hydrated tantalum oxide as the ion exchange material.

Our experiments have shown that hydrated tantalum oxide is an ion exchange material having a limited but useful capacity for ion exchange which is not affected by operation at 300° C. Moreover, it is obtainable in a suitable form, e.g. between 5 and 60 mesh, B.S.S. and is reasonably insoluble in water.

The hydrated tantalum oxide used in the experiments to be described was made by fusing tantalum pentoxide with potassium bisulphate, dissolving the melt in strong oxalic acid solution and precipitating with excess alkali, for example potassium hydroxide or ammonia.

The ore, tantalite ($FeTa_2O_6$) has been used to make a small batch. The ore was fused with the bisulphate and extracted with water. The tantala was insoluble and after washing was dissolved in oxalic acid solution, to which a few drops of sulphuric acid had been added. Precipitation with ammonia followed.

In either case, the precipitate was washed twice with water and then with 1% potassium nitrate solution until oxalate and sulphate were absent. After filtering, the solid was spread in porcelain trays and dried by blowing air. The dry solid was loaded in a column and eluted with potassium nitrate solution until Nessler's Reagent showed that ammonia was absent. The solid was dried in air and bottled. This is the potassium form of hydrous tantalum oxide, a chalky-white solid, mostly between 5 and 30 mesh in size.

The hydrated tantalum oxide may also be made by fusing tantalum oxide, or the ore, tantalite, with an alkali such as potassium hydroxide, dissolving the melt in water, and precipitating with an acid, such as nitric acid, or carbon dioxide.

The preferred route for the preparation of the hydrated tantalum oxide is a modification of the above route and resides in fusing with potassium hydroxide, dissolving in water, filtering, adjusting the concentration $Ta_2O_5$ to be not greater than 5 g. per litre and precipitating with carbon dioxide as dry ice. After washing and drying, the product is large fawn-coloured translucent particles completely unlike the chalky white solid obtained by the bisulphate route or by precipitation with carbon dioxide from concentrated solutions.

This translucent material, although it has the same chemical properties, shows improved physical properties. On wetting it breaks down to smaller particles of about 20 mesh and this size it not affected by heating for 3 hours to 300° C. in water. Moreover the material appears to be harder and this treatment does not produce fines.

In order that the present invention may more readily be understood, several experiments relating to the same will now be described by way of example.

EXPERIMENT 1

In order to assess the ion-exchange capacity of the material at room temperature, 20 g. of the potassium form of hydrated tantalum oxide was put into a column and eluted with 0.1 N ammonium nitrate. Analysis of the eluate showed that 1.68 milliequivalents of ammonium ion per gram of tantalum pentoxide (meq. $NH_4$/g. $Ta_2O_5$) had been absorbed by the column. The eluent was changed to 0.1 N potassium nitrate and 1.61 meq. K/g. $Ta_2O_5$ was absorbed, liberating that quantity of ammonium ion. Similarly, when the column was put into the barium form, eluting with 0.1 N lanthanum nitrate liberated 1.94 meq. Ba/g. $Ta_2O_5$ while that quantity of lanthanum ion was absorbed. The reverse process, i.e. eluting lanthanum with barium, was only partially successful, giving 0.3 meq. La/g. $Ta_2O_5$ in the usual quantity of eluate (100 column-volumes). This is in accordance with experience with other ion-exchange materials, in that trivalent ions are held more strongly than divalent ions.

The column in this mixed Ba-La form was washed with 0.1 N $HNO_3$ when the barium and lanthanum were eluted, leaving the solid in the hydrogen form. By washing then with 0.1 N $KNO_3$, the hydrated tantalum oxide was returned to the potassium form, ready for further use.

EXPERIMENT 2

In order to assess the ion-exchange capacity of the material at elevated temperatures, 80 g. of hydrated tantalum oxide, in the potassium form, was loaded into a pressurized water test rig, and eluted with 130 litres of a sodium nitrate-hydroxide solution at 300° C. The pH of the eulate was 10.8 and the strength 2.929 g. Na ion in 150 litres, or 19.5 p.p.m. The solution contained 24 Na as a tracer. After 46 hours, the effluent concentration had risen to about 50% of the feed strength and 1.46 meq. Na/g. $Ta_2O_5$ had been removed by the hydrated tantalum oxide. About 98% of the sodium in the feed solution was absorbed for a short period at the start falling slowly to 94%, by which time 0.7 meq. Na/g. $Ta_2O_5$ had been absorbed.

EXPERIMENT 3

At elevated temperatures some hydrolysis of the material may occur with the result that, if the material is in the alkali metal form, free alkali metal hydroxide is found in the water. In order to assess this effect, 24 g. of the potassium form of the material was heated in 600 ml. of water, nominal pH 7, for three hours at 300° C. After overnight cooling to room temperature, the liquid was removed and titrated for KOH. Fresh water was added, and a further three hour heating at 300° C. given. By repeating this process, an approximation to continuous extraction is produced.

This extraction process was also made using water pre-adjusted to pH 10.5, since this is the value at which pressurized water reactor systems are usually run. Both sets of hydroysis results are given in Table 1. The total potassium liberated was determined as the sulphate, and residual ion-exchange capacities were estimated.

TABLE 1

| | Alkali found in water, meq./g. $Ta_2O_5$ | |
|---|---|---|
| | pH 7 | pH 10.5 |
| Run Number: | | |
| 1 | 0.175 | 0.157 |
| 2 | 0.073 | 0.050 |
| 3 | 0.059 | 0.045 |
| 4 | 0.050 | 0.039 |
| 5 | 0.053 | 0.025 |
| 6 | 0.053 | 0.025 |
| 7 | 0.036 | 0.031 |
| 8 | 0.039 | |
| Total | 0.538 | 0.372 |
| Total K (as $K_2SO_4$) | 0.458 | 0.416 |
| Residual Capacity of solid: | | |
| K-$NH_4$ | 0.64 | 0.62 |
| $NH_4$-Ba | | 1.045 |

EXPERIMENT 4

In order to assess the effect of time, Run (1) of Experiment 3 was repeated bu the heating time was 7 days instead of 3 hours. Analysis showed 0.20 meq.

$$KOH/g. Ta_2O_5$$

as opposed to 0.175 so that little further hydrolysis took place.

No hydrolysis was detected of the barium form after 24 hours heating.

EXPERIMENT 5

Further hydrolysis tests were made on the potassium form at 100° C., using the same ratio, i.e. 12 g. of hydrated tantalum oxide to 300 ml. of pH 7 water. After one run for three hours, and another for six hours, the six-hour sample was given further washes with fresh water to follow the hydrolysis. The results are shown in Table 2.

TABLE 2

| Run: | Alkali found in water, meq./g. $Ta_2O_5$ |
|---|---|
| 3 hrs. | 0.17 |
| 6 hrs.: | |
| 1 | 0.185 |
| 2 | 0.073 |
| 3 | 0.067 |

EXPERIMENT 6

Tests in water at room temperature have also been made. Using the same ratio of 12 g. to 300 ml. pH 7 water, the mixture was let stand with occasional shaking for twenty-four hours. Again, the wash was repeated. The results are shown in Table 3.

TABLE 3

| Run: | Alkali found in water, meq./g. $Ta_2O_5$ |
|---|---|
| 1 | 0.146 |
| 2 | 0.062 |
| 3 | 0.034 |
| 4 | 0.018 |

It is hence apparent that though some loss by hydrolysis may occur, considerable ion-exchange capacity remains after these treatments.

EXPERIMENT 7

In order to assess the performance of the material under simulated operating conditions, a quantity was inserted in a pressurised high temperature loop wherein water at pH 10.5 and temperature of 300° C. was circulated over the tantala at the rate of 12 gallons per minute for 21 days. To provide for the release of radionuclides a hollow cylinder of irradiated steel was also placed in the loop. Table 4 shows the total quantity of these nuclides released and absorbed.

TABLE 4

| Nuclide | Released into loop (μc.) | Presented to tantala *(μc.) | Retained by tantala | |
|---|---|---|---|---|
| | | | μc. | Percent of that presented |
| Cobalt-60 | 145 | 79 | 59 | 75 |
| Silver-110m | 1.08 | 1.06 | 1.05 | 99 |
| Iron-59 | 131 | 70 | 50 | 71 |
| Antimony-124 | 1.33 | 0.4 | 0 | 0 |
| Chromium-51 | 137 | 89 | 80 | 90 |
| Zinc-65 | 3.9 | 1.26 | 0.3 | 24 |
| Mercury-203 | 13.5 | 7.25 | 3.2 | 44 |

*The quantity released less that deposited on the walls before reaching the tantala column.

During this loop test it was observed that the solubility of the tantala was 0.12 mg./litre or 0.120 part per million (weight/volume). This will give a saturation activity of tantalum=182 of $1.7 \times 10^{-4}$ ci./litre at a flux of $10^{12}$ n./cm.$^2$/sec.

Thus it will be seen that hydrated tantalum oxide forms an efficient ion exchange material which may be used in on-line ion exchange equipment for pressurised water cooled reactors at temperatures of about 300° C.

We claim:
1. A method of making an ion exchange material comprising the steps of fusing a material selected from the group consisting of tantalum oxide and tantalite with potassium hydroxide, dissolving the fused product in water, filtering to remove any undissolved solids, adjusting the concentration of $Ta_2O_5$ to be not greater than 5 g. per liter of water and precipitating hydrated tantalum oxide therefrom with solid carbon dioxide.

References Cited
UNITED STATES PATENTS

| 2,943,912 | 7/1960 | Brown et al. | 23—23 |
| 2,950,966 | 8/1960 | Foos | 23—22 X |
| 3,332,737 | 7/1967 | Kraus | 23—140 X |

HERBERT T. CARTER, Primary Examiner

U.S. Cl. X.R.

23—18, 19, 20, 22, 23, 24, 140; 210—24, 38